United States Patent [19]

Orita et al.

[11] 4,138,558

[45] Feb. 6, 1979

[54] ANTHRAQUINONE COMPOUNDS

[75] Inventors: Ryuzo Orita, Yono; Mitsuru Kurosawa, Urawa, both of Japan

[73] Assignee: Nippon Kayaku Kabushiki Kaisha, Tokyo, Japan

[21] Appl. No.: 800,173

[22] Filed: May 25, 1977

[30] Foreign Application Priority Data

May 27, 1976 [JP] Japan .............................. 51-60621
Sep. 27, 1976 [JP] Japan .............................. 51-114671

[51] Int. Cl.² .................. C07D 251/50; C07D 251/44
[52] U.S. Cl. .................................. 544/189; 544/294; 8/1 B; 8/1 E; 8/40; 8/54.2
[58] Field of Search .......................................... 544/189

[56] References Cited

U.S. PATENT DOCUMENTS 3,763,159  10/1973  Smith ................................... 544/189
3,972,881  8/1976  Altermatt ............................. 544/189

Primary Examiner—John M. Ford
Attorney, Agent, or Firm—Russell & Nields

[57] ABSTRACT

Anthraquinone compounds represented by the following formula are useful as dyes:

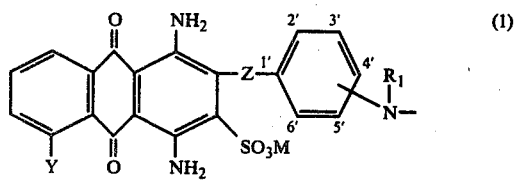

(1)

-continued

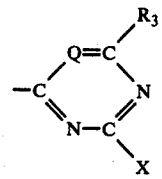

wherein Y stands for a hydrogen atom or a nitro group, Z stands for an oxygen or sulfur atom when Y stands for a hydrogen atom, but Z stands for an oxygen atom when Y stands for a nitro group, $R_1$ stands for a hydrogen atom or a lower alkyl group, $R_3$ stands for a halogen atom or a group $R_2$ wherein $R_2$ stands for an amino, substituted or unsubstituted lower alkylamino, substituted or unsubstituted arylamino, substituted or unsubstituted alkoxy, substituted or unsubstituted aryloxy, substituted or unsubstituted alkylthio, substituted or unsubstituted arylthio group, or a group

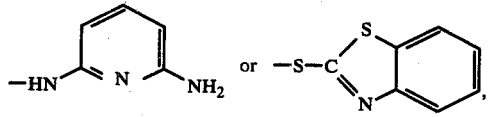

Q stands for a nitrogen atom or carbon atom bearing a halogen atom when $R_3$ stands for a halogen atom, but Q stands for a nitrogen atom when $R_3$ stands for a group $R_2$, X stands for a halogen atom, the group

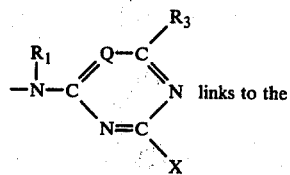 links to the links to the benzene ring in the 3'- or 4'-position, and M stands for an alkali metal or hydrogen atom.

16 Claims, No Drawings

ANTHRAQUINONE COMPOUNDS

BACKGROUND OF THE INVENTION

It has already been known that dyes having a halogenotriazine group or a halogenopyrimidine group react with cellulose fibers in the presence of an acid-binding agent, and numerous dyes have been used actually as reactive dyes. These dyes are characterized in that they have a good wet fastness and light fastness and that dyeings therewith have an excellent brightness in color shade.

However, among reactive dyes for dip dyeing there have been no blue dyes with excellent fastnesses and brightness which are characteristics of this kind of dyes, and so it is intensively desired that such dyes which can dye cellulose fibers deep blue by dip dyeing method should be developed.

SUMMARY OF THE INVENTION

The dyes of formula (1) used in the present invention give very strong bright, fast, deep blue dyeings when cellulose fibers are dip-dyed.

The dyes give very strong bright dyeings with a wide range of color when they are mixed with other dyes.

These dyes are suitable for padding and printing too.

These are new, and the dyeings with them are very bright and display an excellent build-up property, as compared with reactive dyes obtained by using bromamine acid (1-amino-4-bromoanthraquinone-2-sulfonic acid) as a starting material, when cellulose fibers are dip-dyed. Color Index Reactive Blue 5 and color Index Reactive Blue 2 as typical examples of the prior reactive dyes are compared with the dyes of formula (1) in the following table.

Fifty parts of cotton knitted goods were immersed in a solution containing a certain amount of dyes, 60 parts of anhydrous sodium sulfate in 1,000 parts of water and treated at 80° C for 30 minutes. Then 20 parts of sodium carbonate were added to the solution and dyeing was carried out at the same temperature for 60 minutes. The dyed goods were washed with water, soaped thoroughly with Scourol #900 (a nonionic surface active agent manufactured by Kao Soap Co., Ltd.), washed with water and dried.

In order to measure build-up property the following procedure was used:

Dyeing was carried out with C.I. Reactive Blue 5 at 2% o.w.f. and dyeing with other dyes was also done so as to obtain the same depth of shade as one with C.I. Reactive Blue 5. Then dyeing with each dye was carried out in four times the former concentration and the dyeings thus obtained were visually assessed.

DETAILED DESCRIPTION OF THE INVENTION

The dyes of formula (1) in the present invention may be manufactured by either of the following two methods, herein referred to as Process I and Process II.

In Process I, anthraquinone compounds of formula (1) are manufactured by reacting a compound of the formula:

(2)

wherein Q, X and $R_3$ have the meanings given above,

| Dyes used in the present invention | Color Shade | Brightness | Build-up property | |
|---|---|---|---|---|
| [anthraquinone structure 1] | considerably more reddish | very strong brighter | 100 | much better |
| [anthraquinone structure 2] | a little more reddish | very strong brighter | 100 | much better |
| C.I. Reactive Blue 5 | standard | standard | a visual depth of shade on the dyeing at 2 % o.w.f. is used as a standard and defined to be 100. | a visual depth of shade on the dyeing at 8 % o.w.f. is used as a standard and defined to be 100. |
| C.I. Reactive Blue 2 | more greenish | darker | 100 | a little better |

In obtaining the data given in the foregoing table, the dyeing process used was as follows:

with an anthraquinone compound of the formula:

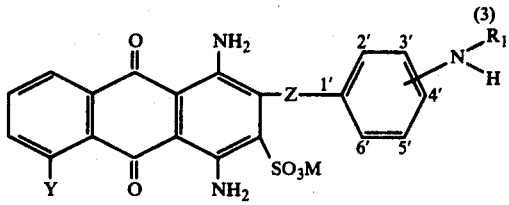 (3)

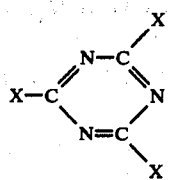 (5)

wherein Y, Z, $R_1$ and M have the meanings given above, and wherein the group

links to the benzene ring in the 3'- or 4'-position.

In Process II, anthraquinone compounds of the formula:

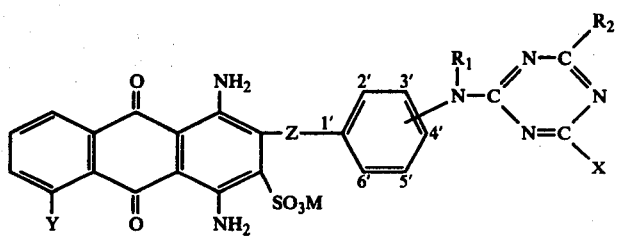 (4)

wherein Y, Z, $R_1$, $R_2$, X and M have the meanings given above, and wherein the group

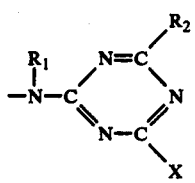

links to the benzene in the 3'- or 4'-position, are manufactured by reacting a triazine compound of the formula:

wherein X has the meaning given above, with an anthraquinone compound of formula (3) and a compound of the formula:

$R_2H$ (6)

wherein $R_2$ has the meaning given above, in an arbitrary order. In Process I the reaction of compounds of formula (2) with anthraquinone compounds of formula (3) is carried out in a conventional way, preferably in the presence of acid-binding agents such as sodium carbonate. When a 2,4,6-trihalogeno-1,3,5-triazine is used as a compound of formula (2), the reaction may be carried out by dissolving 1 mole of a compound of formula (3) at pH 6-7.0 in an adequate solvent such as water and adding 1 mole of the said triazine at 10° C or below, preferably 0-7° C. When a 2,4,5,6-tetrahalogenopyrimidine or a compound of formula (2) wherein $R_3 = R_2$ is used as a compound of formula (2), the reaction is preferably effected at little higher temperature, for example, 30 – 50° C at pH 6-9 in water.

Process II is shown by either one of the following chemical reactions herein referred to as Process IIa and Process IIb.

In Process IIa, the following chemical reaction occurs:

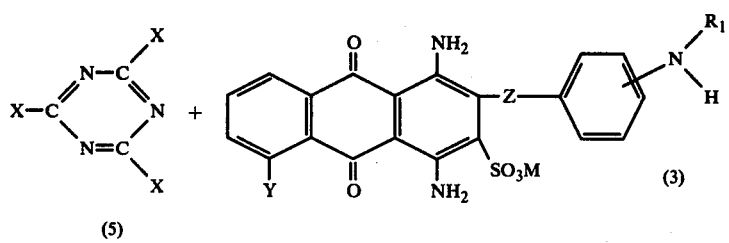

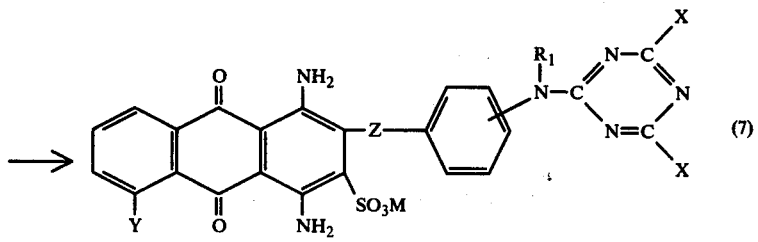

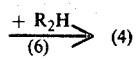 (4)

In Process IIb, the following chemical reaction occurs:

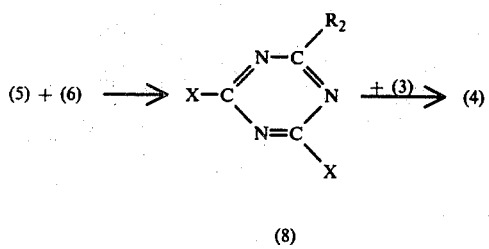

These reactions are preferably carried out in the presence of an acid-binding agent by the conventional methods. The reaction of compounds of formula (5) with compounds of formula (3) and the reaction of compounds of formula (5) with compounds of formula (6) are conducted at 10° C or below, preferably 0 – 7° C, and the next reaction of compounds of formula (7) with compounds of formula (6) and the reaction of compounds of formula (8) with compounds of formula (3) are suitably conducted at a little higher temperature, for example 30 – 50° C.

Compounds of formula (7) and (8) may be used in the following reaction with or without separating from the reaction solution. Anthraquinone compounds thus obtained can be isolated in the form of powder from the reaction solution by salting-out, filtration and drying, or by spray-drying the reaction solution. The anthraquinone compounds are very readily soluble in water when they are in the form of an alkali metal salt such as sodium or potassium.

As examples of compounds of formula (2) there may be mentioned, for example, 2,4,5,6-tetrachloropyrimidine, 2,4,5,6-tetrabromopyrimidine, 2,4,6-trichlorotriazine, 2,4,6-tribromotriazine, 2,4-dichlorotriazine or 2,4-dibromotriazine substituted with $R_2$ at the 6-position.

Compounds of formula (2) where $R_3$ stands for $R_2$ can be prepared by reacting a 2,4,6-trihalogenotriazine with a compound of the formula (6). As examples of compounds of formula (3) there may be mentioned, for example, sodium 1,4-diamino-2-(m or p-aminophenoxy)-anthraquinone-3-sulfonate, sodium 1,4-diamino-2-(m- or p-N-methylaminophenoxy) anthraquinone-3-sulfonate, sodium 1,4-diamino-2-(m- or p-amino- phenoxy)-5-nitroanthraquinone-3-sulfonate, sodium 1,4-diamino-2-(m- or p-N-methylaminophenoxy)-5-nitroanthraquinone-3-sulfonate, sodium 1,4-diamino-2-(m or p-amino-phenylthio)-anthraquinone-3-sulfonate, sodium 1,4-diamino-2-(m or p-N-methylaminophenylthio)-anthraquinone-3-sulfonate.

Examples of compounds of formula (5) include 2,4,6-trichlorotriazine and 2,4,6-tribromotriazine.

As examples of compounds of formula (6) there may be, for example, ammonia, substituted or unsubstituted alkylamine such as methylamine, ethylamine, propylamine, butylamine, glycine, methoxypropylamine, ethanolamine, ethanolamine sulfonate, taurine, dimethylamine, diethylamine, diethanolamine, morpholine, substituted or unsubstituted arylamine such as aniline, o, m or p-chloroaniline, o, m or p-toluidine, o, m or p-anisidine, o, m or p-phenetidine, o, m or p-sulfoaniline, 2,4-, 2,5-or 3,5-disulfoaniline, o, m or p-carboxyaniline, 4 or 5-sulfo-2-carboxyaniline, 2 or 5-sulfo-3-carboxyaniline, 2- or 3-sulfo-4-carboxyaniline, 4,5 or 6-sulfo-methylaniline, 2- or 3-sulfo-4-methylaniline, 3-methyl-4-sulfoaniline, 2,4-disulfo-6-methylaniline, 3,5-disulfo-4-methylaniline, 2- or 3-sulfo-4-methoxyaniline, 5-sulfo-2-methoxyaniline, 2- or 6-sulfo-3-chloroaniline, 3 or 5-sulfo-2-chloroaniline, 2 or 3-sulfo-4-chloroaniline, N-methylaniline, 2-, 3- or 4-sulfo-N-methylaniline, 2- or 3-sulfo-4-acetylaminoaniline, 2- or 4-sulfo-3-acetylaminoaniline.

2-, 3-, 4-, 5-, 6-, 7- or 8-sulfo-α-naphthylamine, 1-, 5-, 6-, 7- and 8- β-naphthylamine, 3,8-, 4,6-, 4.7-, 4.8- or 3,6-disulfo-α-naphthylamine and 1,5-, 4,8-, 3.6- or 6.8 -disulfo-β-naphthylamine, substituted or unsubstituted alcohol such as methanol, ethanol, n- or iso-propanol, n-, iso, sec- or tert-butanol, ethyleneglycolmonomethylether, ethyleneglycolmonoethylether ethyleneglycolmonobutylether, diethylenglycolmonomethylether and γ-methoxy-n-butanol, substituted or unsubstituted phenols such as phenol, o-, m- or p-chlorophenol, o-, m- or p-cresol, o-, m- or p-methoxyphenol, o-, m- or p-nitrophenol, o-, m- or p-sulfophenol and o-, m- or p-carboxyphenol, substituted or unsubstituted alkylthiol such as methylmercaptane, ethylmercaptane and butylmercaptane, β-hydroxyethylmercaptane, arylthiol such as thiophenol, o-, m- or p-methylthiophenol and o-, m- or p-methoxythiophenol, 2,6-diaminopyridine and 2-mercaptobenzothiozole.

With a view towards economy in manufacture of compounds and the dyeing property of compounds, one preferred class of the anthraquinone compounds of the present invention includes the dyes of formula (1) wherein Y and Z have the meanings given above, $R_1$ stands for a hydrogen atom or an alkyl group having 1 to 4 carbon atoms, $R_3$ stands for a chlorine or bromine atom or $R_2$, wherein $R_2$ stands for an amino, alkylamino having 1 to 4 carbon atoms, —NHCH$_2$COOH, —NHCH$_2$CH$_2$CH$_2$OCH$_3$, —NHCH$_2$CH$_2$OH, —NHCH$_2$CH$_2$OSO$_3$H, —NHCH$_2$CH$_2$SO$_3$H, —N(CH$_3$)$_2$, —N(C$_2$H$_5$)$_2$, —N(CH$_2$CH$_2$OH)$_2$,

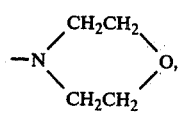

anilino, chloroanilino, toluidino, anisidino, phenetidino, acetoaminoanilino, monosulfoanilino, disulfoanilino, carboxyanilino,

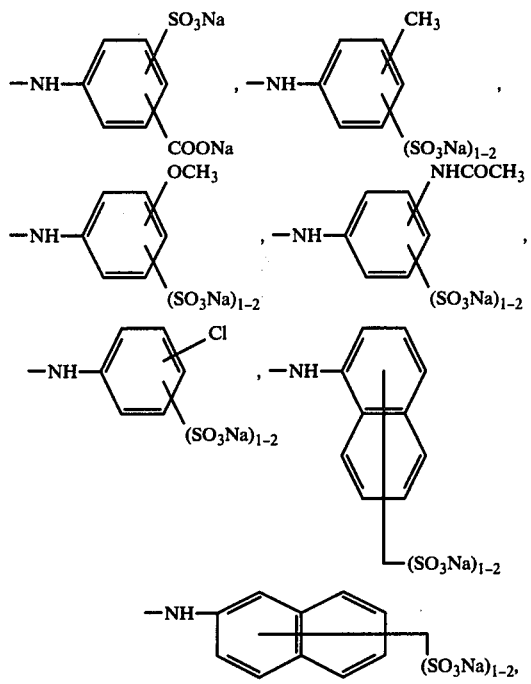

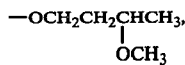

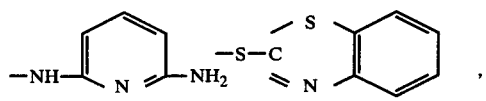

alkoxy having 1 to 4 carbon atoms, —OCH$_2$CH$_2$OCH$_3$, —OCH$_2$CH$_2$OCH$_2$CH$_2$OCH$_3$, —OC$_2$H$_4$OC$_2$H$_5$, —OCH$_2$CH$_2$OCH$_2$CH$_2$CH$_2$CH$_3$,

—OCH$_2$CH$_2$CHCH$_3$,
             |
             OCH$_3$ phenoxy, chlorophenoxy, methylphenoxy, methoxyphenoxy, nitrophenoxy, sulfophenoxy, carboxyphenoxy, methylthio, ethylthio, butylthio, —SC$_2$H$_4$OH, phenylthio, methylphenylthio, methoxyphenylthio,

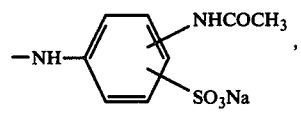

Q stands for a nitrogen atom or carbon atom bearing a chlorine or bromine atom when R$_3$ stands for a chlorine or bromine atom, but Q stands for a nitrogen atom when R$_3$ stands for a group R$_2$, X stands for a chlorine or bromine atom, M stands for a hydrogen, sodium or potassium atom.

A second preferred class of the anthraquinone compounds of the present invention comprises the dyes of formula (1) wherein Y, Z, R$_1$, R$_2$, R$_3$, X and M have the meanings given in the above preferred class, and Q stands for a nitrogen atom. A third preferred class of the anthraquinone compounds of the present invention comprises the dyes of formula (1) wherein Y, R$_1$, R$_2$, R$_3$, X, Q and M have the meanings given in the second preferred class, Z stands for an oxygen atom. A fourth preferred class of the anthraquinone compounds of the present invention comprises the dyes of formula (1) wherein Y, Z, R$_2$, R$_3$, X, Q and M have the meanings given in the third preferred class and R$_1$ stands for a hydrogen atom.

A fifth preferred class of the anthraquinone compounds of the present invention comprises the dyes of formula (1) wherein Y, Z, R$_1$, X, Q and M have the meanings given in the third preferred class, and R$_3$ stands for R$_2$ and R$_2$ stands for an amino, —NHCH$_2$CH$_2$OH, —NHCH$_2$CH$_2$SO$_3$H,

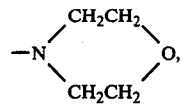

monosulfoanilino, disulfoanilino, carboxyanilino,

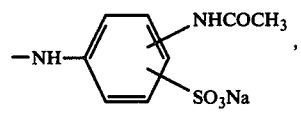

methoxy, —OCH$_2$CH$_2$OCH$_3$ or —OCH$_2$CH$_2$OCH$_2$CH$_3$.

A sixth preferred class of the anthraquinone compounds of the present invention comprises the dyes of formula (1) where Z, R$_1$, R$_2$, R$_3$, X, Q and M have the meanings given in the fifth preferred class and Y stands for a hydrogen atom.

A seventh preferred class of the anthraquinone compounds of the present invention comprises the dyes of formula (1) wherein Z, R$_1$, R$_2$, R$_3$, X, Q and M have the meanings given in the fifth preferred class and Y stands for a nitrogen group.

The present invention includes, for example, the following dyeing processes: dip-dyeing, padding or printing of cellulose fibers or their mixed spun fibers by using the anthraquinone compounds of formula (1) in the presence of acid-binding agents.

Naturally anthraquinone compounds of formula (1) can be used for dyeing in a mixture among themselves and also with any other dyes.

As acid-binding agents used in dyeing there may be mentioned, for example, sodium hydrocarbonate, sodium metaphosphate, sodium phosphate, sodium ortho- or meta-silicate, sodium carbonate, sodium hydroxide and the like.

In case the dyeing process of the present invention is applied to dyeing treatment with a relatively long liquor-to-goods ratio such as a batch-wise dip dyeing, the bath is usually prepared with an inorganic salt such as sodium chloride or sodium sulfate and the dye, and after the dyeing is preferably carried out for 10 – 60 minutes while heating at 30 – 100° C, an acid-binding agent is added to the bath and then the dyeing is continued for 20 – 60 minutes while heating at 30 – 100° C. In this case an acid-binding agent may be added at the beginning of the dyeing, and moreover, after the dyeing is carried out at a neutral condition, fixation of dyes may be done in another bath containing an acid-binding agent.

In case the dyeing process of the present invention is applied to dyeing treatment with a little shorter liquor-to-goods ratio such as padding, the dye-bath is usually prepared with the dye, an acid-binding agent, a penetrating agent and, if necessary, urea, and after fibers are immersed in the bath for a short time, the fibers are squeezed, allowed to stand at room temperature or under heating or steamed or dry-heated for a short time. Alternatively, fibers can be first immersed in a solution of an acid-binding agent and then padded in a neutral bath, or after padding in a neutral bath, fibers can be treated in a solution of an acid-binding agent which is saturated with an inorganic salt and then allowed to stand or heat-treated.

In case the dyeing process of the present invention is applied to printing treatment, fibers are printed with a colour paste usually containing sodium alginate or an emulsion paste as a thickener, the dye, an acid-binding agent, urea and the like, then dried intermediately, and heat-treated or allowed to stand at room temperature or under heating to fix the dyes on the fibers. If desired, fibers which are immersed in a solution of an acid-binding agent are printed with a neutral colour paste or overprinted and then the fibers can be allowed to stand or heat-treated.

Fibers dyed by such dip-dyeing, padding or printing treatment can be slightly washed with water and then usually treated with a fixing agent in the market for anionic dyes, preferably, a fixing agent of polyethylenepolyamines.

The following examples serve to illustrate the present invention but they are not intended to limit it thereto.

In the examples part(s) and % are by weight.

EXAMPLE 1

A mixture of 43 parts of disodium salt of 1,4-diaminoanthraquinone-2,3-disulfonic acid, 30 parts of p-acetylaminophenol, 11 parts of potassium carbonate and 80 parts of dimethylformamide was stirred at 140° C for 3 hours. This reaction solution was poured into 1000 parts of water. The mixture was filtered to remove insoluble components. 300 parts of sodium chloride was added to the filtrate and was filtered again. The cake was washed with 500 parts of a 20% aqueous solution of sodium chloride. The cake thus obtained was dissolved in 450 parts of water and 130 parts of hydrochloric acid was added to the solution. The solution was heated to 95° C and stirred for 10 hours. After cooling the solution was filtered to obtain 1,4-diamino-2-(4'-aminophenoxy)anthraquinone-3-sulfonic acid. 4 parts of sulfanilic acid were added to 200 parts of water and the solution was adjusted to pH 7 with soda ash. 4.1 parts of cyanuric chloride were added to the solution at 0° C, the reaction was continued for 1 hour and after the solution was neutralized, excess cyanuric chloride was removed by filtration. To the filtrate there were added 9 parts of 1,4-diamino-2-(4'-aminophenoxy) anthraquinone-3-sulfonic acid, the solution was kept at 35 - 40° C, a 10% solution of soda ash was added and the reaction was carried out for 2 hours while adjusting the pH to 5 - 7. 60 parts of sodium chloride were added to the reaction solution. The dye precipitated was filtered and dried. There was obtained 13 parts of a dye represented by the following formula:

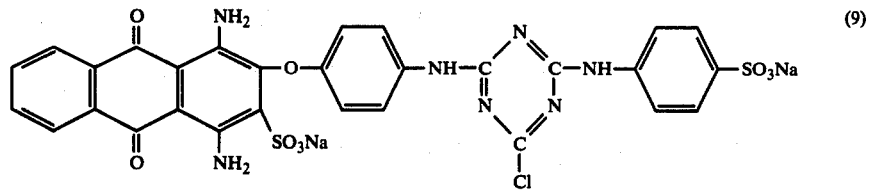

(9)

μ max. : 580 mμ in pure water

Elemental analysis values (Sample purified by column chromatography was used)

|   | Found | Calculated |
|---|-------|------------|
| C | 46.20% | 46.18% |
| H | 2.40% | 2.39% |
| N | 13.01% | 13.01% |
| Cl | 4.70% | 4.71% |
| S | 8.50% | 8.49% |

EXAMPLE 2

A dye-bath was prepared by using 1 part of the dye of formula (9), 60 parts of anhydrous sodium sulfate and 1000 parts of water. 50 parts of cotton knitted goods were immersed into the dye-bath and treated at 80° C for 30 minutes. Then 20 parts of sodium carbonate were added to the dye-bath and dyeing was continued at the same temperature for 60 minutes. After washing with water the dyed goods were soaped thoroughly with Scourol #900 (a nonionic surface active agent manufactured by Kao Soap Co., Ltd.), washed with water and dried. The dyed goods thus obtained were bright reddish blue.

EXAMPLE 3

In a similar manner as described in Example 1, 1,4-diamino-2-(3'-aminophenoxy)-anthraquinone-2-sulfonic acid was manufactured by using 1,4-diaminoanthraquinone-2,3-disulfonic acid and metaacetylaminophenol. 4.5 parts of this anthraquinone compound were added to 100 parts of water and the solution was adjusted to pH 6.5 with a 10% aqueous solution of sodium carbonate. Then ice was added to cool the solution to 0° C and 1.9 parts of cyanuric chloride was added. The reaction was carried out at 0 - 3° C for 1 hour while adjusting the solution to pH 5 - 6by using a 10% aqueous solution of sodium carbonate. After removing insoluble components, 20 parts of sodium chloride were added to the solution and the dye precipitated was filtered and dried. The resultant compound was represented by the formula:

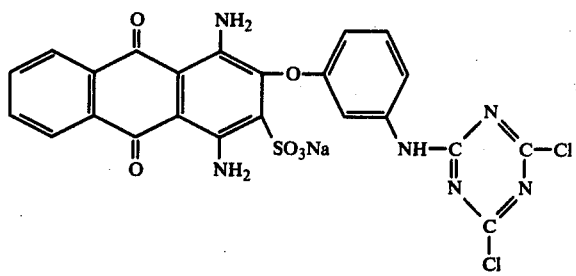

(10)

λ max. : 578 mμ (in pure water)

Elemental analysis values (Sample purified by column chromatograph was used)

|   | Found | Calculated |
|---|-------|------------|
| C | 46.41 % | 46.39 % |
| H | 2.18 % | 2.18 % |
| N | 14.05 % | 14.12 % |
| Cl | 11.82 % | 11.93 % |
| S | 5.36 % | 5.38 % | parts of water was added to the reaction solution and adjusted to pH 6.5 with a 10% solution of soda ash. Then the solution was heated to 35° C and the reaction was continued for 1 hour while adjusting the pH to 5 - 6. To the reaction solution there were added 60 parts of sodium chloride and the dye thus obtained was filtered and dried.

The dye is represented by the formula:

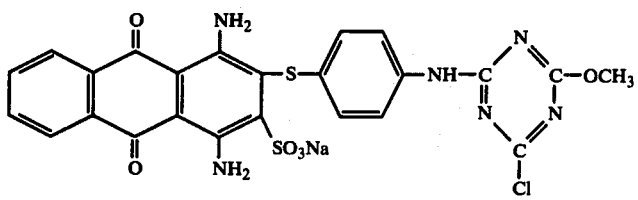

(12)

λ max. : 656 m μ (in a 20% aqueous solution of pyridine)

Elemental Analysis values (Sample purified by column chromatography was used)

|   | Found | Calculated |
|---|-------|------------|
| C | 47.58 % | 47.49 , % |
| H | 2.74 % | 2.64 % |
| N | 13.75 % | 13.85 % |
| Cl | 5.80 % | 5.85 % |
| S | 10.58 % | 10.55 % |

EXAMPLE 4

A dyebath was prepared by using 1 part of the dye of formula (10), 50 parts of anhydrous sodium sulfate and 1000 parts of water. 50 parts of spun rayon were immersed into the dyebath and treated at 30° C for 30 minutes. Then 20 parts of sodium carbonate were added and dyeing was conducted at the same temperature for 60 minutes. A reddish blue dyeing was obtained by treating in a similar manner as described in Example 2.

EXAMPLE 5

A solution of 43 parts of disodium 1,4-diaminoanthraquinone-2,3-disulfonate, 25 parts of p-aminothiophenol and 8 parts of sodium bicarbonate in 500 parts of water was stirred at 25° C for 3 hours. To the reaction solution there were added 100 parts of sodium chloride and the precipitate thus obtained was filtered and dried.

The compound of the following formula was obtained.

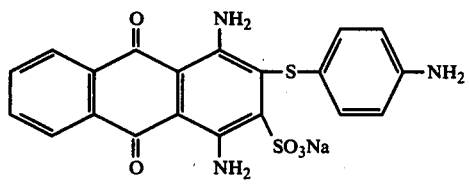

(11)

A solution of 80 parts of methanol and 2 parts of sodium bicarbonate was cooled to 0° C and 4.45 parts of cyanuric chloride were added to the solution. After the reaction was carried out at 0 - 3° C for 1 hour, a solution of 9.5 parts of the said anthraquinone compound in 200

EXAMPLE 6

A cotton cloth was immersed into a solution which was prepared by mixing 20 parts of the dye of formula (12), 200 parts of urea and 740 parts of water and adding 20 parts of a 10% thickener of sodium alginate and 20 parts of sodium carbonate. Then the cloth was squeezed so as to weight twice as much as the original, subjected to intermediate drying, and then to heat-treatment at 160° C for 2 minutes.

The dyed cloth was washed and soaped to obtain a greenish blue dyeing.

EXAMPLE 7

4.5 parts of sodium 1,4-diamino-2-(4'-aminophenoxy)-anthraquinone-3-sulfonate were added to 100 parts of water and to this solution there was added a solution of 2.3 parts of 2-carboxymethylamino-4,6-dichlorotriazine in 100 parts of water. While maintaining the solution at 40° C and adjusting it to pH 6.5 - 7.5 with a 10% solution of sodium carbonate the reaction was carried out.

After completion of the reaction, the dye obtained was salted out by adding sodium chloride, filtered off and dried.

The dye was represented by the formula:

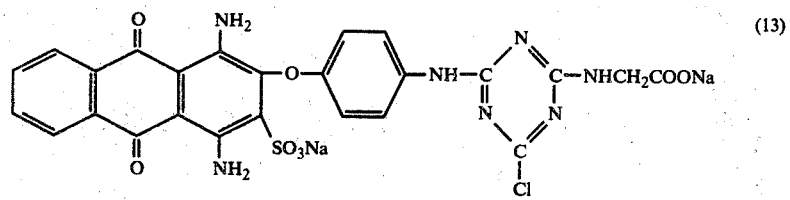

(13)

λ max. : 580 mμ (in pure water)

Elemental Analysis Value (Sample purified by column chromatography was used)

|   | Found   | Calculated |
|---|---------|------------|
| C | 45.72 % | 45.77 %    |
| H | 2.46 %  | 2.44 %     |
| N | 14.91 % | 14.95 %    |
| Cl| 5.40 %  | 5.42 %     |
| S | 4.85 %  | 4.88 %     |

EXAMPLE 8

20 parts of the dye of formula (13), 2 parts of Liponox OCS (a non-ionic penetrating agent manufactured by Lion Fat & Oil Co., Ltd.), 20 parts of sodium carbonate, 200 parts of urea and 505 parts of water were mixed and to this solution there were added 250 parts of a 10% solution of sodium alginate to prepare a colour paste. A cotton cloth was printed with the colour paste, subjected to intermediate drying, then steamed at 102° C for 2 minutes, washed with water, treated at 60° C for 20 minutes in a bath which was prepared with 2 parts of Suprefix WF New (a fixing agent of polyamines made by Nippon Senka Co., Ltd.) and 1000 parts of water, washed with water and dried. There was thus obtained a very bright, deep reddish blue dyeing.

EXAMPLE 9

A dye-bath was prepared with 1.2 parts of the dye of formula (9), 0.8 part of C.I. Reactive Blue 71 and 60 parts of anhydrous sodium sulfate in 1000 parts of water. 50 parts of a cotton knitted cloth were immersed in the bath and treated at 80° C for 30 minutes. 20 parts of sodium carbonate were then added to the bath and dyeing was carried out at the same temperature for 60 minutes. After the dyed cloth was washed with water it was thoroughly soaped and dried.

The dyed cloth thus obtained had a very good bright, deep blue colour.

EXAMPLE 10

6 parts of the dye of formula (10) were dissolved in 200 parts of water. While keeping at 35 – 40° C, 0.35 part of methylamine in the form of a 40% aqueous solution were added to the said solution. The reaction was carried out for 3 hours while adjusting the pH to 6.5 – 7.5 with a 10% soda ash aqueous solution. 25 parts of sodium chloride were added to precipitate the dye, which was filtered off and dried.

The dye thus obtained was represented by the formula:

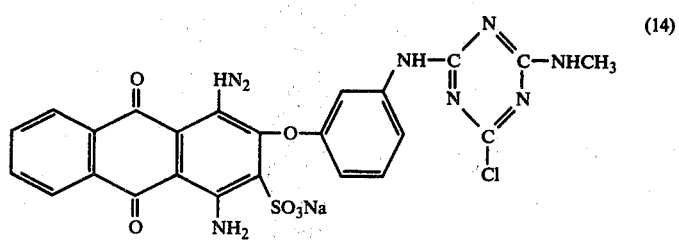

(14)

It dyed cotton fibers reddish blue.

λ max. : 579 mμ (in pure water)

Elemental Analysis Value (Sample purified by column chromatography was used)*

|   | Found   | Calculated |
|---|---------|------------|
| C | 48.75 % | 48.85 %    |
| H | 2.89 %  | 2.88 %     |
| N | 16.57 % | 16.62 %    |
| Cl| 6.06 %  | 6.02 %     |
| S | 5.40 %  | 5.43 %     |

*Note :
adsorbent used : activated almina
solvent used : n-butanol : pyridine : water
= 1 : 1 : 1

EXAMPLE 11

The dyes represented by the formula:

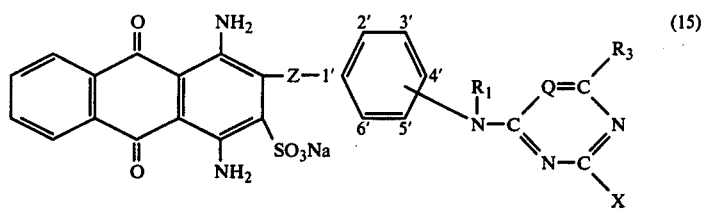

wherein $Z$, $R_1$, $R_3$, the linkage position of

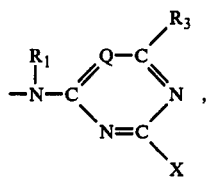

$Q$ and $X$ are described in the following table, were obtained in a similar manner as used in Example 1, 3, 5, 7 and 10 and they gave fast dyeings having colour shades mentioned in the table.

| No. | Z | $R_1$ | $R_3$ | Linkage position | Q | X | Colour |
|---|---|---|---|---|---|---|---|
| 1 | S | H | —Cl | 4' | N | Cl | Greenishblue |
| 2 | S | H | —Br | 4' | N | Br | " |
| 3 | S | H | —Cl | 4' | Cl–C | Cl | " |
| 4 | S | $CH_3$ | —Cl | 4' | N | Cl | " |
| 5 | S | —$CH_2CH_3$ | —$NH_2$ | 4' | N | Cl | " |
| 6 | S | —$CH_2CH_2CH_2CH_3$ | —$NHCH_2CH_3$ | 3' | N | Cl | " |
| 7 | S | H | —$NHCH_2CH_2CH_3$ | 4' | N | Cl | " |
| 8 | S | $CH_3$ | —$NHCH_2CH_2CH_2CH_3$ | 3' | N | Cl | " |
| 9 | S | H | —$NHCH_2CH_2OCH_3$ | 3' | N | Cl | " |
| 10 | S | $CH_2CH_3$ | —Cl | 3' | C—Cl | Cl | " |
| 11 | S | H | —$NHCH_2CH_2OH$ | 3' | N | 3' | " |
| 12 | S | H | —$NHCH_2CH_2OSO_3Na$ | 4' | N | Cl | " |
| 13 | S | H | —$NHCH_2CH_2SO_3Na$ | 4' | N | Cl | " |
| 14 | S | $CH_3$ | —N($CH_3$)$_2$ | 4' | N | Cl | " |
| 15 | S | H | —N($CH_2CH_3$)$_2$ | 4' | N | Cl | " |
| 16 | S | $CH_2CH_3$ | —N($CH_2CH_2OH$)$_2$ | 3' | N | Cl | " |
| 17 | S | $CH_3$ | —N(morpholino) | 4' | N | Cl | " |
| 18 | S | H | —NHC$_6$H$_5$ | 3' | N | Cl | " |
| 19 | S | H | —NH-C$_6$H$_4$-Cl | 3' | N | Br | " |

-continued
Linkage position of
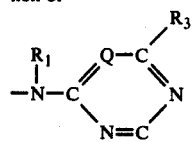
| No. | Z | R₁ | R₃ | X | Q | X | Colour |
|---|---|---|---|---|---|---|---|
| 20 | S | H | —NH—⟨C₆H₄⟩—Cl (3-Cl) | 4' | N | Cl | " |
| 21 | S | CH₃ | —NH—⟨C₆H₄⟩—Cl (2-Cl) | 3' | N | Cl | " |
| 22 | S | H | —NH—⟨C₆H₄⟩—CH₃ | 4' | N | Cl | " |
| 23 | S | H | —NH—⟨C₆H₄⟩—OCH₃ | 4' | N | Br | " |
| 24 | S | H | —NH—⟨C₆H₄⟩—OCH₂CH₃ | 4' | N | Cl | " |
| 25 | S | H | —NH—⟨C₆H₄⟩—SO₃Na | 4' | N | Cl | " |
| 26 | S | H | —NH—⟨C₆H₄⟩—SO₃Na | 3' | N | Cl | " |
| 27 | S | H | —NH—⟨C₆H₄⟩—SO₃Na (ortho) | 3' | N | Cl | " |
| 28 | S | H | ⟨C₆H₄⟩—SO₃Na, a mixture of meta and para isomers | 3' | N | Cl | " |
| 29 | S | CH₃ | —NH—⟨C₆H₃⟩(SO₃Na)₂ | 4' | N | Cl | " |
| 30 | S | H | —NH—⟨C₆H₄⟩—COONa | 4' | N | Cl | " |

-continued

| | | | | Linkage position of 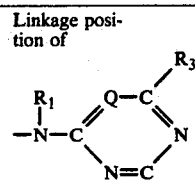 | | | |
|---|---|---|---|---|---|---|---|
| No. | Z | R₁ | R₃ | X | Q | X | Colour |
| 31 | S | H | —NH—⟨benzene with SO₃Na (para), COONa (ortho)⟩ | 4' | N | Cl | " |
| 32 | S | H | —NH—⟨benzene with CH₃ (para), SO₃Na (ortho)⟩ | 3' | N | Cl | " |
| 33 | S | H | —NH—⟨benzene with OCH₃ (para), SO₃Na (ortho)⟩ | 4' | N | Cl | " |
| 34 | S | H | —NH—⟨benzene with Cl (para), SO₃Na (ortho)⟩ | 4' | N | Cl | " |
| 35 | S | H | —NH—⟨pyridine with NH₂⟩ | 4' | N | Cl | " |
| 36 | S | H | —S—C⟨benzothiazole⟩ | 4' | N | Cl | " |
| 37 | S | H | —NH—⟨naphthalene-SO₃Na⟩ | 3' | N | Cl | " |
| 38 | S | H | —NH—⟨naphthalene with 2 SO₃Na⟩ | 3' | N | Cl | " |
| 39 | S | H | —NH—⟨naphthalene with 2 SO₃Na⟩ | 3' | N | Cl | " |
| 40 | S | H | —OCH₂CH₂CH₃ | 3' | N | Cl | " |
| 41 | S | H | —OCH(CH₃)₂ | 4' | N | Cl | " |
| 42 | S | H | —OCH₂CH₂CH₂CH₃ | 4' | N | Cl | " |
| 43 | S | CH₃ | —OCH₂CH₂OCH₃ | 4' | N | Cl | " |
| 44 | S | CH₂CH₃ | —OCH₂CH₂OCH₂CH₂OCH₃ | 4' | N | Cl | " |
| 45 | S | CH₂CH₂CH₃ | —O—⟨phenyl⟩ | 4' | N | Cl | " |
| 46 | S | H | —O—⟨4-chlorophenyl⟩ | 4' | N | Cl | " |

-continued

Linkage position of

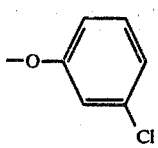

| No. | Z | $R_1$ | $R_3$ | X | Q | X | Colour |
|---|---|---|---|---|---|---|---|
| 47 | S | $CH_3$ | 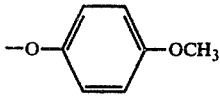 | 4' | N | Cl | " |
| 48 | S | H | 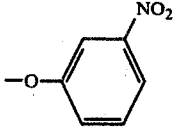 | 4' | N | Cl | " |
| 49 | S | —$CH_3$ | 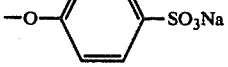 | 3' | N | Cl | " |
| 50 | S | H | 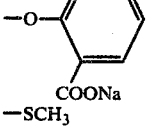 | 3' | N | Cl | " |
| 51 | S | H | 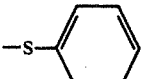 | 4' | N | Cl | " |
| 52 | S | $CH_3$ | —$SCH_3$ | 4' | N | Cl | " |
| 53 | S | H | —$SCH_2CH_2OH$ | 4' | N | Cl | " |
| 54 | S | H | —$SCH_2CH_3$ | 3' | N | Cl | " |
| 55 | S | H | —$SCH_2CH_2CH_3$ | 3' | N | Cl | " |
| 56 | S | H |  | 4' | N | Cl | " |
| 57 | S | H | 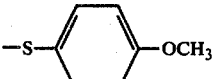 | 4' | N | Cl | " |
| 58 | S | H | 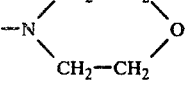 | 3' | N | Cl | " |
| 59 | O | H | —Cl | 4' | C—Cl | Cl | Reddishblue |
| 60 | O | H | —Br | 3' | N | Br | " |
| 61 | O | $CH_3$ | —$NH_2$ | 4' | N | Cl | " |
| 62 | O | $CH_2CH_3$ | —$NHCH_2CH_2OH$ | 4' | N | Cl | " |
| 63 | O | H | —N($CH_2CH_2OH$)$_2$ | 4' | N | Cl | " |
| 64 | O | $CH_3$ | —$NHCH_2CH_2SO_3Na$ | 4' | N | Br | " |
| 65 | O | H | —$NHCH_2CH_2CH_2OCH_3$ | 4' | N | Cl | " |
| 66 | O | H | —$NHCH_2CH_2OSO_3Na$ | 4' | N | Cl | " |
| 67 | O | $CH_2CH_3$ | —$NHCH_2CH_2CH_3$ | 3' | N | Cl | " |
| 68 | O | H | morpholino | 3' | N | Cl | " |
| 69 | O | H | 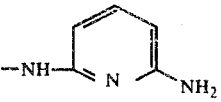 | 4' | N | Cl | " |

-continued

| No. | Z | $R_1$ | $R_3$ | Linkage position of $R_3$ on triazine | Q | X | Colour |
|---|---|---|---|---|---|---|---|
| 70 | O | $CH_3$ | benzodithiazole -S-S-N= | 4' | N | Cl | " |
| 71 | O | H | -NH-phenyl | 3' | N | Cl | " |
| 72 | O | $CH_2CH_2CH_3$ | -NH-C$_6$H$_4$-Cl | 4' | N | Cl | " |
| 73 | O | H | -NH-C$_6$H$_4$-CH$_3$ (meta) | 4' | N | Cl | " |
| 74 | O | H | -NH-C$_6$H$_4$-CH$_3$ (para) | 4' | N | Cl | " |
| 75 | O | H | -NH-C$_6$H$_4$-OCH$_3$ | 4' | N | Cl | " |
| 76 | O | H | -NHCH$_3$ | 4' | N | Cl | " |
| 77 | O | H | -NH-C$_6$H$_3$(OCH$_3$)(SO$_3$Na) | 4' | N | Cl | " |
| 78 | O | H | -NH-C$_6$H$_4$-SO$_3$Na (meta) | 4' | N | Cl | " |
| 79 | O | H | -NH-C$_6$H$_4$-SO$_3$Na (ortho) | 4' | N | Cl | " |
| 80 | O | H | -NH-C$_6$H$_3$(SO$_3$Na)$_2$ | 4' | N | Cl | " |
| 81 | O | H | -NH-C$_6$H$_4$-SO$_3$Na (a mixture of meta and para isomers) | 3' | N | Cl | " |
| 82 | O | H | -NH-C$_6$H$_4$-COONa | 4' | N | Br | " |

-continued

| | | | | Linkage position of $\begin{matrix}R_1 & Q & R_3 \\ -N-C & \| & C \\ & \| & \| \\ & N & N \\ & \| & \| \\ & C & \\ & \| & \\ & X & \end{matrix}$ | | | |
|---|---|---|---|---|---|---|---|
| No. | Z | $R_1$ | $R_3$ | | Q | X | Colour |
| 83 | O | $CH_3$ | 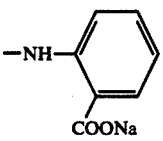 —NH—C₆H₄—COONa (ortho) | 4' | N | Cl | " |
| 84 | O | H | 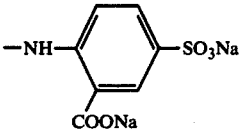 —NH—C₆H₃(SO₃Na)(COONa) | 4' | N | Cl | " |
| 85 | O | H | 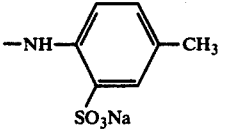 —NH—C₆H₃(CH₃)(SO₃Na) | 4' | N | Cl | " |
| 86 | O | H | 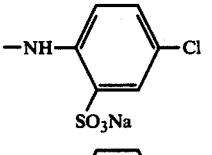 —NH—C₆H₃(Cl)(SO₃Na) | 3' | N | Cl | " |
| 87 | O | H | 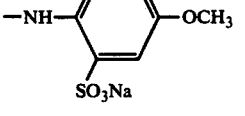 —NH—C₆H₃(OCH₃)(SO₃Na) | 3' | N | Cl | " |
| 88 | O | H | 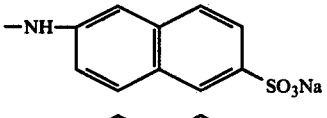 —NH—naphthyl—SO₃Na | 4' | N | Cl | " |
| 89 | O | H | 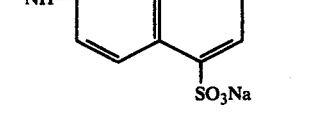 —NH—naphthyl—SO₃Na | 4' | N | Cl | " |
| 90 | O | H | 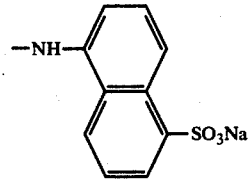 —NH—naphthyl—SO₃Na | 3' | N | Cl | " |
| 91 | O | H | 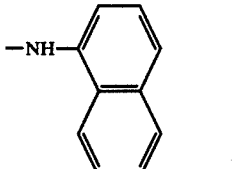 —NH—naphthyl—SO₃Na | 4' | N | Cl | " |
| 92 | O | $CH_3$ | —$OCH_3$ | 4' | N | Cl | " |
| 93 | O | H | —$CH_2CH_2OCH_3$ | 3' | N | Cl | " |
| 94 | O | H | —$OCH_2CHCH_3$<br>     $OCH_3$ | 4' | N | Cl | " |
| 95 | O | H | —$OCH_2CH_2CH_2OCH_3$ | 4' | N | Cl | " |

-continued

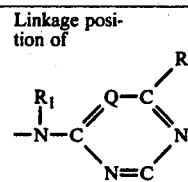

| No. | Z | R₁ | R₃ | Linkage position of | Q | X | Colour |
|-----|---|-----|-----|------|---|---|--------|
| 96 | O | H | —OCH₂CH₂OCH₂CH₂OCH₃ | 4' | N | Cl | " |
| 97 | O | H | —OCH₂CH₂OCH₂CH₂OCH₃ | 4' | N | Br | " |
| 98 | O | H | —O—C₆H₅ | 4' | N | Cl | " |
| 99 | O | H | —O—C₆H₄—Cl (2-Cl) | 4' | N | Cl | " |
| 100 | O | H | —O—C₆H₄—Cl (4-Cl) | 4' | N | Cl | " |
| 101 | O | H | —O—C₆H₄—OCH₃ | 4' | N | Cl | " |
| 102 | O | CH₂CH₃ | —O—C₆H₄—CH₃ | 4' | N | Cl | " |
| 103 | O | H | —O—C₆H₄—CH₃ | 3' | N | Cl | " |
| 104 | O | H | —O—C₆H₄—NO₂ | 4' | N | Cl | " |
| 105 | O | H | —O—C₆H₄—SO₃Na | 4' | N | Cl | " |
| | | | —O—C₆H₄—COONa | | | | |
| 106 | O | H | —OCH₃ | 4' | N | Cl | " |
| 107 | O | H | Cl | 4' | N | Cl | " |
| 108 | O | H | —SCH₃ | 4' | N | Cl | " |
| 109 | O | CH₃ | —SCH₂CH₃ | 4' | N | Br | " |
| 110 | O | H | —SCH₂CH₂OH | 3' | N | Cl | " |
| 111 | O | H | —SCH₂CH₂CH₂CH₂CH₃ | 4' | N | Cl | " |
| 112 | O | H | —S—C₆H₅ | 3' | N | Cl | " |
| 113 | O | H | —S—C₆H₄—CH₃ | 4' | N | Cl | " |
| 114 | O | H | —S—C₆H₄—OCH₃ | 4' | N | Cl | " |

-continued

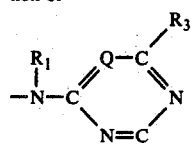
Linkage position of

| No. | Z | R$_1$ | R$_3$ | X | Q | X | Colour |
|---|---|---|---|---|---|---|---|
| 115 | O | H | —NHCH$_3$ | 4' | N | Cl | " |
| 116 | O | H | —NHCH$_2$H$_5$ | 4' | N | Cl | " |
| 117 | O | H | —NHCH$_2$CH$_2$OH | 4' | N | Cl | " |
| 118 | O | H | —NH—C$_6$H$_5$ | 4' | N | Cl | " |
| 119 | O | H | —NH$_2$ | 4' | N | Cl | " |
| 120 | O | H | —N(CH$_3$)—C$_6$H$_5$ | 4' | N | Cl | " |
| 121 | O | H | —N(CH$_3$)—C$_6$H$_4$—SO$_3$Na (p) | 4' | N | Cl | " |
| 122 | O | H | —N(CH$_3$)—C$_6$H$_4$—SO$_3$Na (m) | 4' | N | Cl | " |
| 123 | O | H | —N(CH$_3$)—C$_6$H$_4$—SO$_3$Na (o) | 4' | N | Cl | " |
| 124 | O | H | —NH—C$_6$H$_3$(NHCOCH$_3$)(SO$_3$Na) | 3' | N | Cl | " |
| 125 | O | H | —NH—C$_6$H$_3$(NHCOCH$_3$)(SO$_3$Na) | 4' | N | Cl | " |
| 126 | O | H | —NH—C$_6$H$_3$(SO$_3$Na)(NHCOCH$_3$) | 4' | N | Cl | " |
| 127 | O | H | —NH—naphthyl(SO$_3$Na)$_2$ | 4' | N | Cl | " |
| 128 | O | H | —NH—naphthyl(SO$_3$Na)$_2$ | 3' | N | Cl | " |

-continued

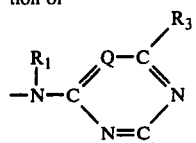

| No. | Z | R₁ | R₃ | Linkage position of X | Q | X | Colour |
|-----|---|----|----|------|---|---|--------|
| 129 | O | H | -NH-[naphthalene-1,4-di(SO₃Na)] (linked at 2-position) | 4' | N | Cl | " |
| 130 | O | H | -NH-[naphthalene-1,5-di(SO₃Na)] (linked at 2-position) | 3' | N | Cl | " |
| 131 | O | H | -NH-[naphthalene-5-SO₃Na, 7-SO₃Na] (linked at 1-position) | 4' | N | Cl | " |
| 132 | O | H | -NH-[naphthalene-5-SO₃Na, 7-SO₃Na] (linked at 1-position) | 3' | N | Cl | " |
| 133 | O | H | -NHCH₂CH₂SO₃Na | 4' | N | Cl | " |
| 134 | O | H | -NH-C₆H₅ | 4' | N | Cl | " |
| 135 | O | H | -OC₂H₄OC₂H₅ | 3' | N | Cl | " |

EXAMPLE 12

1.9 parts of metanilic acid were added to 100 parts of water and the mixture was adjusted to pH 6.5 – 7.0 with soda ash. To this there was added ice to cool it to 0° C and added 2.0 parts of cyanuric chloride followed by stirring for one hour at 0 – 5° C. The solution was adjusted to pH 6.5 – 7.0 with a 10% sodium carbonate aqueous solution and filtered to remove excess cyanuric chloride. To the filtrate there were added 4.9 parts of the anthraquinone compound of the following formula:

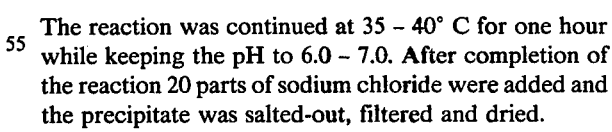
(16)

The reaction was continued at 35 – 40° C for one hour while keeping the pH to 6.0 – 7.0. After completion of the reaction 20 parts of sodium chloride were added and the precipitate was salted-out, filtered and dried.

The compound thus obtained had the following formula:

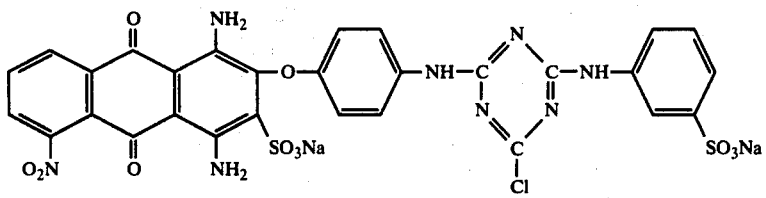

(17)

λ max. : 590 mμ (in a 20% pridine-water)

Elemental analysis of the compound purified by thin-layer chromatography (Solvent ; butanol : pridine : water = 1 : 1 : 1)

|   | Found   | Calculated |
|---|---------|------------|
| C | 43.45 % | 43.58 %    |
| H | 2.24 %  | 2.13 %     |
| N | 14.10 % | 14.03 %    |
| Cl| 4.39 %  | 4.45 %     |
| S | 7.99 %  | 8.02 %     |

The compound of the formula (16) used in this example was obtained by the following procedure:

A mixture of 200 parts of 90% sulfuric acid, 16 parts of boric acid and 35.2 parts of 1,4-diamino-2,3-dichloro-5-nitroanthraquinone was stirred at 80° C for 2 hours to form a boric acid ester.

To a solution containing 1000 parts of water, 300 parts of sodium carbonate and 38 parts of sodium sulfite there was added dropwise a sulfuric acid solution of the above boric acid ester while maintaining the temperature at 10 -15° C by adding ice. After adding the pH was adjusted to 10.0 with a 10% caustic soda solution.

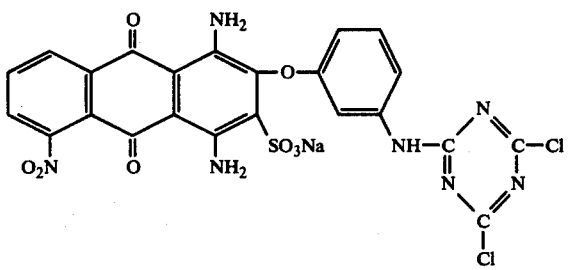

(19)

The temperature was raised slowly to 80° C, followed by stirring one hour. The colour of the solution changes from yellow green to blue. The solution was then filtered hot for removing insoluble components. 300 parts of sodium chloride were added to the filtrate and the crystal precipitated was filtered off. The crystal is disodium, 1,4-diamino-5-nitroanthraquinone - 2,3-disulfonate. A mixture of 49 parts of 1,4-diamino-5-nitroanthraquinone-2,3-disulfonic acid, 30 parts of p-acetylaminophenol, 6.9 parts of potassium carbonate and 80 parts of dimethylformamide was stirred at 110° C for 4 hours. After completion of the reaction, the reaction mixture is poured into 1000 parts of water and mixed with 300 parts of sodium chloride. The precipitate was salted out and filtered off. All the cake containing water was added to 350 parts of water and then 100 parts of conc. hydrochloric acid was added to hydrolyze at 95° C for 10 hours. After cooling the precipitate was filtered to obtain the compound of formula (16).

Example 13

5 parts of the compound of the formula:

(18)

were dissolved at pH 6.5 - 7.0 in parts of water. The temperature cooled down to 0 - 3° C by adding ice, 2.0 parts of cyanuric chloride were added and the reaction was carried out at 0 - 5° C for one hour. The pH was adjusted to 6.5 with a 10% sodium carbonate solution and the reaction mixture was filtered to remove excess cyanuric chloride. 20 parts of sodium chloride were added to the filtrate followed by salting-out, filtering and drying.

The compound thus obtained was represented by the formula:

λ max. 588 mμ

Elemental Analysis

Sample purified by thin layer chromatography (Solvent; butanol : pyridine : water = 1 : 1 : 1) was used.

|   | Found   | Calculated |
|---|---------|------------|
| C | 35.01 % | 34.89 %    |
| H | 2.43 %  | 2.38 %     |
| N | 19.39 % | 19.43 %    |
| Cl| 7.01 %  | 7.04 %     |
| S | 6.29 %  | 6.34 %     |

Example 14

A solution containing 80 parts of methanol and 2 parts of sodium bicarbonate was cooled down to 0° C and 4.45 parts of cyanuric chloride were added. After the reaction was continued at 0 - 3° C for one hour a solution of 10.2 parts of the compound of the formula:

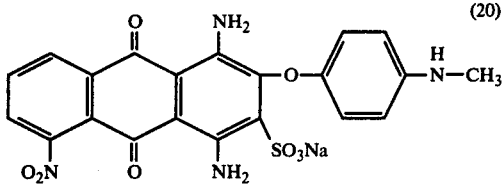

(20)

and 200 parts of water was added and the pH was adjusted to 6.5 with a 10% sodium carbonate solution. The temperature was raised to 35° C and the reaction was carried out for one hour while keeping pH 6 – 7 with a 10% sodium carbonate.

The reaction mixture was filtered to remove insoluble components and the 30 parts of sodium chloride were added and the precipitate was filtered off and dried. Thus, there was obtained the dye of the formula:

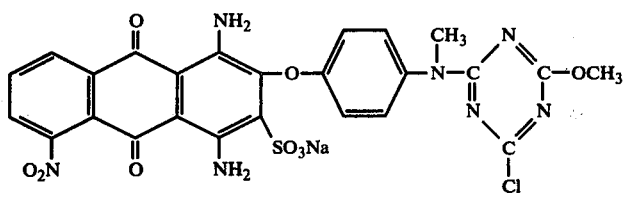

λ max. 591 mμ (in a 20% pyridine aqueous solution)

Elemental Analysis (Sample purified by thin layer chromatography was used)

|   | Found | Calculated |
|---|-------|-----------|
| C | 46.10 % | 46.19 % |
| H | 2.68 % | 2.62 % |
| N | 15.02 % | 15.09 % |
| Cl | 5.44 % | 5.47 % |
| S | 4.95 % | 4.93 % |

EXAMPLE 15

A solution of 5 parts of the compound of formula (16) in 100 parts of water was mixed with a solution of 2.3 parts of 2-carboxymethylamino-4,6-dichlorotriazine in 100 parts of water and the temperature was maintained at 40° C. The reaction was carried out keeping pH 6.5 – 7.5 with a 10% sodium carbonate solution. After completion of the reaction, the precipitate was salted out, filtered and dried. Thus there was obtained the dye of the formula:

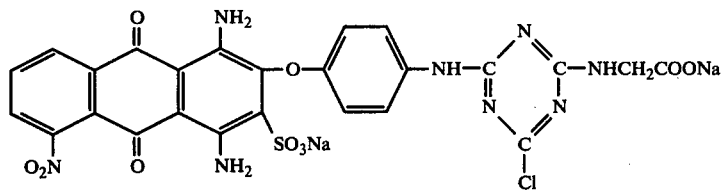

λ max. 590 mμ (20 % pyridine-water)

Elemental Analysis (Sample purified by chromatography was used)

|   | Found | Calculated |
|---|-------|-----------|
| C | 44.85 % | 44.88 % |
| H | 2.29 % | 2.24 % |
| N | 16.73 % | 16.75 % |
| Cl | 5.27 % | 5.31 % |
| S | 4.83 % | 4.79 % |

EXAMPLE 16

5 parts of the compound of formula (16) were added to 200 parts of water and dissolved by adjusting the pH to 6.5. The temperature was cooled down to 3° C or below and 1.9 parts of cyanuric chloride were added. The reaction mixture was stirred for one hour at 3° C or below. After completion of the reaction 1.9 parts of metanilic acid were added. The reaction mixture was stirred for one hour at 30 – 35° C, maintaining the pH at 6.5 – 7.0 with a 10% sodium carbonate aqueous solution. 25 parts of sodium chloride were added to the reaction mixture and the precipitate ws filtered off and dried. Thus there was obtained the anthraquinone compound of formula (17).

EXAMPLE 17

A dyebath was prepared with 1 part of the dye of formula (17), 80 parts of anhydrous sodium sulfate and 1,000 parts of water. 50 parts of knitted cotton cloth were immersed into the bath, treated for 30 minutes at 80° C. Then 20 parts of sodium carbonate were added and dyeing was carried out for 60 minutes at the same temperature. After washing with water, the dyed product was soaped thoroughly with Scourole No. 900 (a nonionic surface active agent manufactured by Kao soap Co., Ltd.) washed with water and dried. Thus there was obtained a bright blue dyeing.

EXAMPLE 18

50 parts of spun rayon were immersed into a bath containing 1 parts of the dye of formula (19), 50 parts of anhydrous sodium sulfate and 1,000 parts of water, treated for one half hour at 30° C and then 20 parts of sodium carbonate were added and dyeing was carried out 1 hour at the same temperature. The dye product was treated in the same manner as in Example 17. Thus there was obtained a bright blue dyeing.

EXAMPLE 19

Cotton cloth was immersed into a bath containing a mixture of 20 parts of the dye of formula (21), 200 parts of urea and 740 parts of water, 20 parts of a 10% sodium alginate thickner and 20 parts of sodium carbonate. The cloth was squeezed so as to weigh twice as much as the original cloth, subjected to intermediate drying and heat-treatment at 160° C for 2 minutes. The dyed cloth was washed with water and soaped to obtained a bright blue dyeing

EXAMPLE 20

A colour paste was prepared by mixing 20 parts of the dye of formula (22) with 2 parts of Liponox OCS (a nonionic penetrating agent manufactured by Lion Fat & Oil Co., Ltd.) 20 parts of sodium carbonate, 200 parts of urea and 505 parts of water, adding 250 parts of 10% sodium alginate aqueous solution to this and stirring well. Cotton cloth was printed with the colour paste, dried intermediately, steamed for two minutes at 102° C, washed with water, treated at 60° C for 20 minutes in a bath containing 2 parts of Suprafix WF New (a polyamine fixing agent manufactured by Nippon Senka Co., Ltd.) and 1,000 parts of water, washed with water and dried.

Thus a bright blue print was obtained.

EXAMPLE 21

5.1 parts of the formula (16) were dissolved in 200 parts of water by adjusting the pH to 6 – 7 with a 10% sodium carbonate aqueous solution. Then 2.2 parts of 2,4,5,6-tetrachloropyrimidine were added and the reaction mixture was heated to 55° C and stirred for 4 hours at the same temperature while keeping the pH to 5 – 6 with a 10% sodium carbonate aqueous solution.

To the reaction mixture there were added 20 parts of sodium chloride. The precipitate was salted out, filtered off and dried. The resultant compound was represented by the formula:

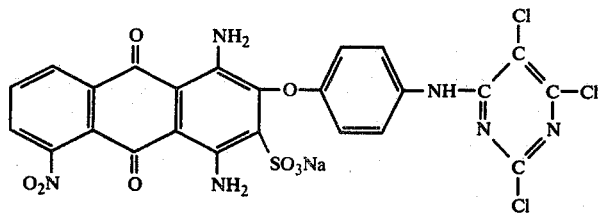

(23)

$\lambda$ max. 590 m$\mu$ (in 20% pyridine water)

Elemental Analysis (Sample purified by chromatography was used: solvent, butanol : pyridine : water = 1 : 1 : 1

|   | Found | Calculated |
|---|-------|------------|
| C | 42.59 % | 42.76 % |
| H | 1.92 % | 1.78 % |
| N | 12.33 % | 12.47 % |
| S | 4.67 % | 4.75 % |
| Cl | 15.68 % | 15.81 % |

EXAMPLE 22

100 parts of cotton knitted cloth were immersed into a bath containing 2 parts of the dye of formula (23) and 4,000 parts of water. The bath was heated to 40° C and 110 parts of anhydrous sodium sulfate and 30 parts of sodium carbonate were added.

Then the temperature was raised in the course of 30 minutes and maintained for 20 minutes. 100 parts of anhydrous sodium sulfate and 50 parts of sodium carbonate were added. The bath was boiled for 1 hour. After cooling the dye cloth was taken out, washed well with water and dried. Thus a bright reddish blue dyeing was obtained.

EXAMPLE 23

The dyes represented by the formula:

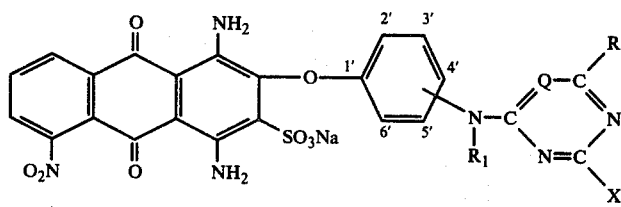

(24)

wherein Z, $R_1$, $R_3$ and X are described in the following table, were obtained in a similar manner as used in Example 12, 13, 14, 15 and 16. They gave fast blue dyeings.

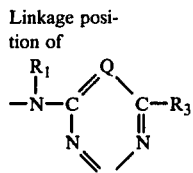

| No. | $R_1$ | $R_3$ | Linkage position of $R_1$ on X | Q | X |
|---|---|---|---|---|---|
| 1 | H | —Cl | 4' | C—Cl | Cl |
| 2 | H | —Br | 3' | N | Br |
| 3 | $CH_3$ | —$NH_2$ | 4' | N | Cl |
| 4 | $CH_2CH_3$ | —$NHCH_2CH_2OH$ | 4' | N | Cl |
| 5 | H | —N($CH_2CH_2OH$)$_2$ | 4' | N | Cl |
| 6 | $CH_3$ | —$NHCH_2CH_2SO_3Na$ | 4' | N | Br |
| 7 | H | —$NHCH_2CH_2CH_2OCH_3$ | 4' | N | Cl |
| 8 | H | —$NHCH_2CH_2OSO_3Na$ | 4' | N | Cl |
| 9 | $CH_2CH_3$ | —$NHCH_2CH_2CH_3$ | 4' | N | Cl |
| 10 | H | morpholino (—N(CH$_2$CH$_2$)$_2$O) | 3' | N | Cl |
| 11 | H | —NH-(6-amino-2-pyridyl) | 4' | N | Cl |
| 12 | $CH_3$ | —S-C(benzothiazol-2-yl) | 4' | N | Cl |
| 13 | H | —NH—C$_6$H$_5$ | 3' | N | Cl |
| 14 | $CH_2CH_3$ | —NH—C$_6$H$_4$—Cl | 4' | N | Cl |
| 15 | H | —NH—C$_6$H$_4$—CH$_3$ (m) | 3' | N | Cl |
| 16 | H | —NH—C$_6$H$_4$—OCH$_3$ (p) | 4' | N | Cl |
| 17 | H | —NH—C$_6$H$_4$—SO$_3$Na (p) | 4' | N | Cl |
| 18 | H | —NH—C$_6$H$_4$—SO$_3$Na (o) | 4' | N | Cl |
| 19 | H | —NH—C$_6$H$_3$(SO$_3$Na)$_2$ | 4' | N | Cl |

-continued

| No. | R₁ | R₃ | Linkage position of X | Q | X |
|---|---|---|---|---|---|
| 20 | H | —NH—⟨C₆H₄⟩—SO₃Na (a mixture of meta and para isomers) | 3' | N | Cl |
| 21 | H | —NH—⟨C₆H₄⟩—COONa | 4' | N | Cl |
| 22 | H | —NH—⟨C₆H₄⟩(o-COONa) | 4' | N | Cl |
| 23 | H | —NH—⟨C₆H₃⟩(SO₃Na)(COONa) | 4' | N | Cl |
| 24 | H | —NH—⟨C₆H₃⟩(CH₃)(SO₃Na) | 4' | N | Cl |
| 25 | H | —NH—⟨C₆H₃⟩(Cl)(SO₃Na) | 3' | N | Cl |
| 26 | H | —NH—⟨C₆H₃⟩(OCH₃)(SO₃Na) | 3' | N | Cl |
| 27 | H | —NH—⟨naphthyl⟩—SO₃Na | 4' | N | Cl |
| 28 | H | —NH—⟨naphthyl⟩—SO₃Na | 4' | N | Cl |
| 29 | H | —NH—⟨naphthyl⟩—SO₃Na | 3' | N | Cl |

-continued

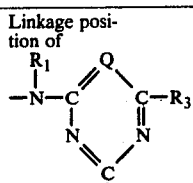

| No. | R₁ | R₃ | Linkage position of X | Q | X |
|---|---|---|---|---|---|
| 30 | H | —NH—[naphthalene-SO₃Na] | 4' | N | Cl |
| 31 | H | —OCH₃ | 4' | N | Cl |
| 32 | H | —OCH₂CH₂OCH₃ | 3' | N | Cl |
| 33 | H | —OCH₂CH₂CH(OCH₃)CH₃ | 4' | N | Cl |
| 34 | H | —OCH₂CH₂CH₂OCH₃ | 4' | N | Cl |
| 35 | H | —OCH₂CH₂OCH₂CH₂OCH₃ | 4' | N | Cl |
| 36 | H | —O—C₆H₅ | 4' | N | Br |
| 37 | H | —O—C₆H₄—Cl (3-Cl) | 4' | N | Cl |
| 38 | H | —O—C₆H₄—Cl (4-Cl) | 4' | N | Cl |
| 39 | H | —O—C₆H₄—CH₃ (4-CH₃) | 4' | N | Cl |
| 40 | H | —O—C₆H₄—OCH₃ | 3' | N | Cl |
| 41 | H | —O—C₆H₄—NO₂ (4-NO₂) | 4' | N | Cl |
| 42 | H | —O—C₆H₄—SO₃Na | 4' | N | Cl |
| 43 | CH₃ | —O—C₆H₄—COONa | 3' | N | Cl |
| 44 | H | —NHCH₃ | 4' | N | Cl |
| 45 | H | —NHCH₂CH₂OH | 4' | N | Cl |
| 46 | H | —SCH₃ | 3' | N | Cl |
| 47 | H | —SCH₂CH₂OH | 4' | N | Cl |
| 48 | H | —SCH₂CH₃ | 4' | N | Cl |
| 49 | H | —SCH₂CH₂CH₃ | 4' | N | Cl |
| 50 | H | —S—C₆H₅ | 3' | N | Cl |

-continued

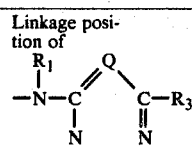

Linkage position of R₁

| No. | R₁ | R₃ | X | Q | X |
|---|---|---|---|---|---|
| 51 | H | -S-C₆H₄-CH₃ | 4' | N | Cl |
| 52 | H | -S-C₆H₄-OCH₃ | 3' | N | Cl |
| 53 | H | —NH₂ | 4' | N | Cl |
| 54 | H | —NH-naphthalene(NaO₃S)(SO₃Na) | 4' | N | Cl |
| 55 | H | —NH₂ | 4' | N | Cl |

What we claim is:

1. An anthraquinone compound represented by the formula:

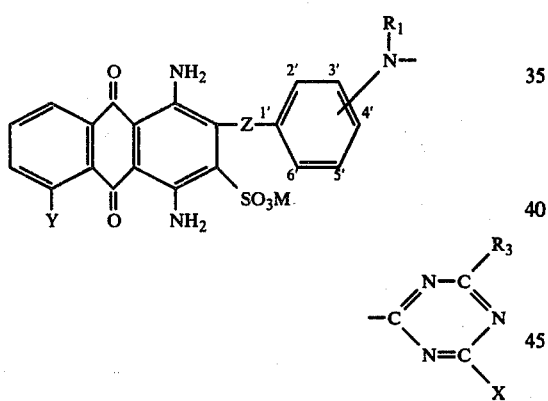

wherein Y stands for a hydrogen atom or nitro group, Z stands for an oxygen or sulfur atom when Y stands for a hydrogen atom, but Z stands for an oxygen atom when Y stands for a nitro group, $R_1$ stands for a hydrogen atom or an alkyl group having 1 to 4 carbon atoms, $R_3$ stands for a chlorine or bromine atom or $R_2$, wherein $R_2$ stands for an amino, alkylamino having 1 to 4 carbon atoms, —NHCH₂COOH, —NHCH₂CH₂CH₂OCH₃, —NHCH₂CH₂OH, —NHCH₂CH₂OSO₃H, —NHCH₂CH₂SO₃H, —N(CH₃)₂, —N(C₂H₅)₂, —N(CH₂CH₂OH)₂, anilino, chloroanilino, toluidino, anisidino, phenetidino, acetoaminoanilino, monosulfoanilino, disulfoanilino, carboxyanilino,

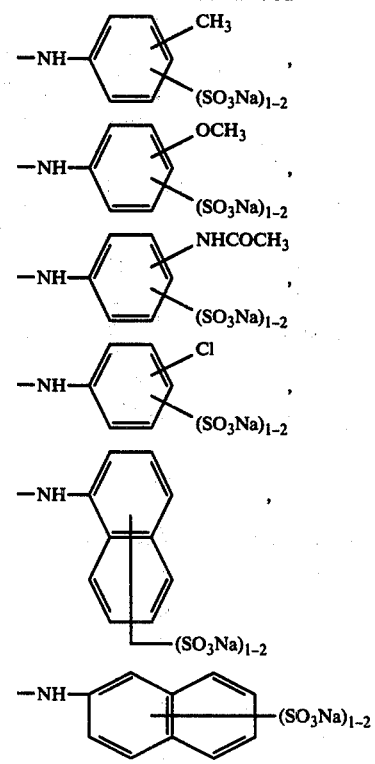

, alkoxy having 1 to 4 carbon atoms, —OCH₂CH₂OCH₃, —OCH₂CH₂OCH₂CH₂OCH₃, —OC₂H₄OC₂H₅, —OCH₂CH₂OCH₂CH₂CH₂CH₃,

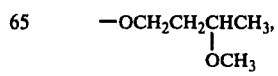

phenoxy, chlorophenoxy, methylphenoxy, methoxyphenoxy, nitrophenoxy, sulfophenoxy, carboxyphenoxy, methylthio, ethylthio, butylthio, —SC$_2$H$_4$OH, phenylthio, methylphenylthio, methoxyphenylthio, N-methylanilino, 2-, 3- or 4- sulfo -N-methylanilino, X stands for a chlorine or bromine atom, M stands for a hydrogen, sodium or potassium atom.

2. An anthraquinone compound as claimed in claim 1 wherein Z stands for an oxygen atom.

3. An anthraquinone compound as claimed in claim 2 wherein R$_1$ stands for a hydrogen atom.

4. An anthraquinone compound as claimed in claim 2 wherein R$_2$ stands for amino, —NHCH$_2$CH$_2$OH, —NHCH$_2$CH$_2$SO$_3$H, monosulfoanilino, disulfoanilino, carboxyanilino,

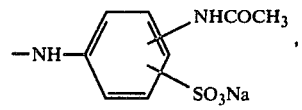

methoxy, —OCH$_2$CH$_2$OCH$_3$, or —OCH$_2$CH$_2$OCH$_2$CH$_3$.

5. An anthraquinone compound as claimed in claim 4 wherein Y stands for a hydrogen atom.

6. An anthraquinone compound as claimed in claim 4 wherein Y stands for a nitro group.

7. The anthraquinone compound of the formula:

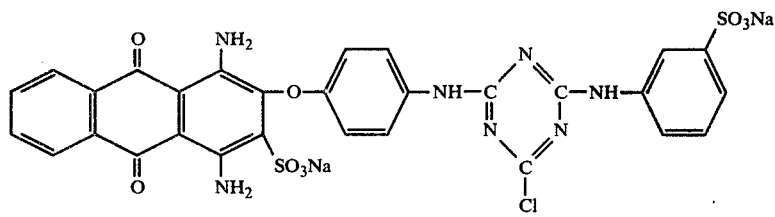

8. The anthraquinone compound of the formula:

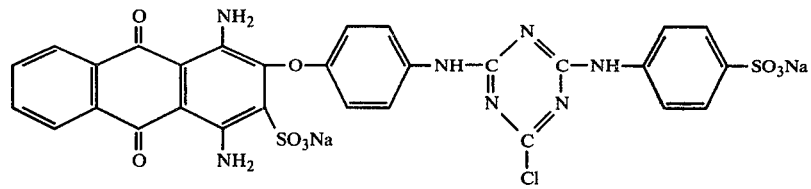

9. The anthraquinone compound of the formula:

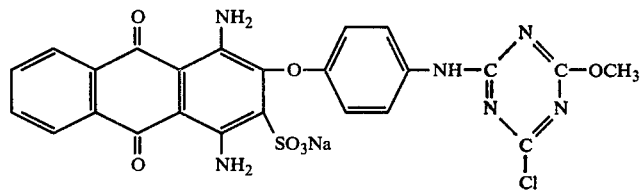

10. The anthraquinone compound of the formula:

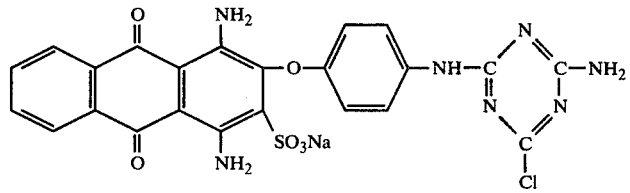

11. The anthraquinone compound of the formula:

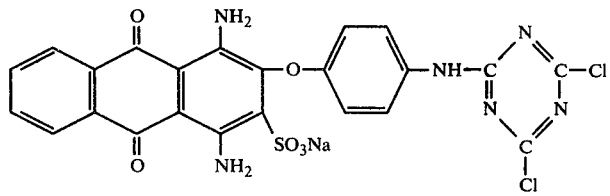

12. The anthraquinone compound of the formula:

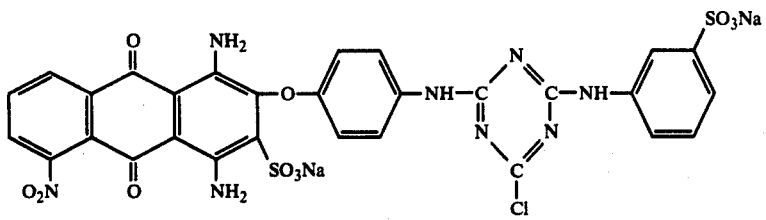
13. The anthraquinone compound of the formula:
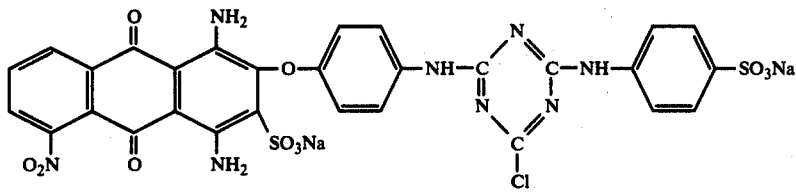
14. The anthraquinone compound of the formula:
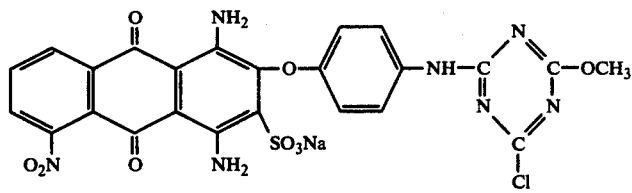
15. The anthraquinone compound of the formula:
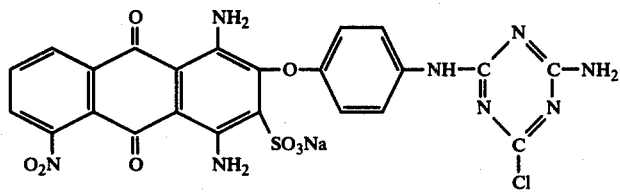
16. The anthraquinone compound of the formula:
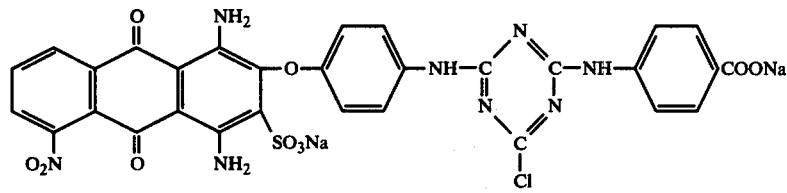
* * * * *